US008095808B2

(12) United States Patent
Perng et al.

(10) Patent No.: US 8,095,808 B2
(45) Date of Patent: Jan. 10, 2012

(54) METHOD, ELEMENT AND CIRCUIT BOARD FOR CONTROLLING SHUTDOWN OF ELECTRONIC DEVICE

(75) Inventors: Chiy-Ferng Perng, Taipei (TW); Chuan-Te Chang, Taipei (TW)

(73) Assignee: Asustek Computer Inc., Taipei (TW)

( * ) Notice: Subject to any disclaimer, the term of this patent is extended or adjusted under 35 U.S.C. 154(b) by 485 days.

(21) Appl. No.: 12/416,559

(22) Filed: Apr. 1, 2009

(65) Prior Publication Data

US 2009/0282235 A1    Nov. 12, 2009

(30) Foreign Application Priority Data

May 9, 2008    (TW) .............................. 97117088 A (51) Int. Cl.
*G06F 1/00* (2006.01)
(52) U.S. Cl. ........................................ 713/310; 713/300
(58) Field of Classification Search .................. 713/300, 713/310
See application file for complete search history.

(56) References Cited

U.S. PATENT DOCUMENTS

| 6,732,280 B1 * | 5/2004 | Cheok et al. ................... 713/300 |
| 2007/0150766 A1 * | 6/2007 | Kuwahara ....................... 713/300 |

FOREIGN PATENT DOCUMENTS

| CN | 1485706 A | 3/2004 |
| CN | 1567136 A | 1/2005 |

OTHER PUBLICATIONS

Iamchappy, Wake on LAN Questions, Mar. 4, 2009, http://www.regvac.com/forum/m-1236199310/.*

* cited by examiner

*Primary Examiner* — Mark Connolly
(74) *Attorney, Agent, or Firm* — Morris Manning & Martin LLP; Tim Tingkang Xia, Esq.

(57) ABSTRACT

The invention provides a method, an element and a circuit board for controlling an electronic device to be shut down. The method according to the invention includes the steps as follows. First, a power control signal is received, and the duration of the power control signal at a preset signal level is calculated. Then, whether the duration is greater than a threshold value is determined. If yes, an interrupt signal is generated and transmitted to a processing module of the electronic device to drive the processing module to set the preset mechanism of the electronic device according to the interrupt signal.

25 Claims, 6 Drawing Sheets

METHOD, ELEMENT AND CIRCUIT BOARD FOR CONTROLLING SHUTDOWN OF ELECTRONIC DEVICE

FIELD OF THE INVENTION

The invention relates to a method, an element and a circuit board for controlling a shutdown of an electronic device and, more particularly, to a method, an element and a circuit board for controlling a force shutdown of an electronic device.

BACKGROUND OF THE INVENTION

With the quick development of the related electronic technology, electronic devices such as computers, mobile phones become necessary auxiliary tools in modern people's daily life. Usually, various kinds of electronic devices all include a mother board with chipsets to perform various functions, passive elements such as resistors and capacitances, and sockets for connecting various functional circuit boards. The chipsets, the passive elements and the sockets are connected to each other via compactness and complex circuits.

Figure 1:
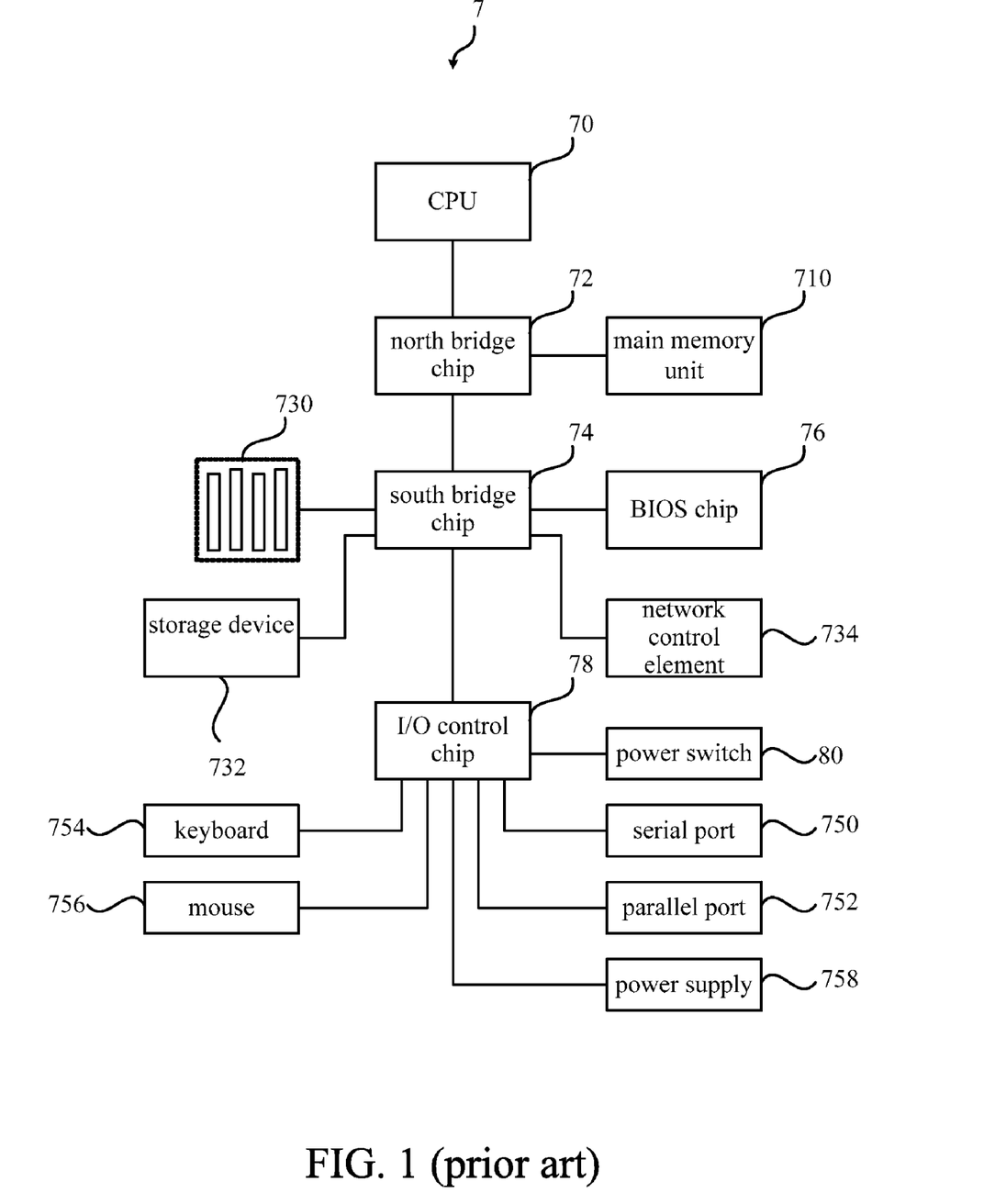
FIG. 1 is a functional block diagram showing the mother board in the prior art.

As shown in FIG. 1, it is a functional block diagram showing a mother board in the prior art. The mother board 7 is mainly composed of a CPU 70, a north bridge chip 72, a south bridge chip 74, a basic input/output system (BIOS) chip 76 and an input/output (I/O) control chip 78. The north bridge chip 72 is responsible for data transmission and control among the CPU 70, a main memory 710 and a display device (not shown). The south bridge chip 74 is used to enable the CPU 70 to communicate with the BIOS chip 76 and part of peripheral devices. The peripheral devices include an interface expansion area 730, a storage device 732, a network control element 734 and other devices which need high transmission speed. In addition, a serial port 750, a parallel port 752, a keyboard 754, a mouse 756, a power supply 758 and other peripheral devices which only need low transmission speed are controlled by the I/O control chip 78.

Furthermore, the BIOS chip 76 may initialize the chipsets and the peripheral devices on the mother board 7, and it may load the operation system from the storage device 732 to the main memory 710. In addition, the BIOS chip 76 also may allow a user to set particular mechanisms such as a wake on local area network (WOL) mechanism, a wake on keyboard mechanism and a wake on mouse mechanism.

To take the WOL as an example, when the electronic device is shut down normally, an operation system calls the BIOS chip 76 to start the WOL mechanism before the power is cut off. Then, the states of the network control element 734, the south bridge chip 74 and other related units are set to be capable of accepting the WOL by the BIOS chip 76. Afterwards, the operation system controls the power supply 758 to cut off the power. Thus, a user may transmit the waking signal packet (such as the magic packet provided by the AMD Corporation) via a remote server to the network control element 734. The network control element 734 then transmits a waking signal to the south bridge chip 74, and the south bridge chip 74 controls the electronic device to boot according to the waking signal.

In addition, the electronic device usually includes a power switch 80, which is connected to the I/O control chip 78. The power switch 80 may transmit a power control signal to the I/O control chip 78. When the power switch 80 is in normal condition, the power control signal has the first signal level. When the power switch 80 is pressed by the user, the signal level of the power control signal is changed to be the second signal level (usually, the second signal level is lower than the first signal level). When the I/O control chip 78 detects that the signal level of the power control signal is changed, it informs the operation system to perform the above mentioned shutdown process.

However, if the electronic device is not shut down normally, if the user continues pressing the power switch 80 for several seconds to make the electronic device shut down forcibly, the power supply 758 directly cuts off the power which makes the BIOS chip 76 have no enough time to set the network control element 734, the south bridge chip 74 and other related units. Thus, the WOL mechanism loses effectiveness. Similarly, other mechanisms which need to be set before the electronic device is shut down by the BIOS chip 76 may lose effectiveness because of the abnormal shutdown of the electronic device.

SUMMARY OF THE INVENTION

An aspect of the invention provides a method for controlling a shutdown of an electronic device to solve the problem in the prior art.

According to an embodiment of the invention, the method includes the steps as follows. First, a power control signal is received, and the duration of the power control signal at a preset signal level is calculated. Then, if the duration is greater than a threshold value is determined. Last, if yes, an interrupt signal is generated and transmitted to a processing module of the electronic device to drive the processing module to set a preset mechanism of the electronic device according to the interrupt signal.

Another aspect of the invention provides an element for controlling a shutdown of an electronic device to solve the problem in the prior art.

According to a preferable embodiment of the invention, the element is connected to a power switch of the electronic device and used for receiving a power control signal transmitted by the power switch. In addition, the element includes a determining module for determining if the duration of the power control signal at a preset signal level is greater than a threshold value. If yes, the determining module generates an interrupt signal and transmits it to a processing module of the electronic device to drive the processing module to set a preset mechanism of the electronic device according to the interrupt signal.

Still another aspect of the invention provides a circuit board for controlling a shutdown of an electronic device to solve the problem in the prior art.

According to a preferable embodiment of the invention, the circuit board includes a control element, a south bridge chip and a processing module. The control element is connected to a power switch and a power supply of the electronic device, respectively, and used to receive a power control signal from the power switch. In addition, the control element determines if the duration of the power control signal at a preset signal level is greater than the threshold value. If yes, the control element generates and outputs an interrupt signal. The south bridge chip is connected to the control element and the processing module, respectively, and used to receive the interrupt signal from the control element and transmit the interrupt signal to the processing module. In addition, the processing module sets a preset mechanism of the electronic device according to the interrupt signal.

These and other features, aspects and advantages of the present invention will become better understood with regard to the following description, appended claims, and accompanying drawings.

DETAILED DESCRIPTION OF THE INVENTION

The invention provides a method, an element and a circuit board for controlling a shutdown of an electronic device. More particularly, preset mechanisms of the electronic device are set before the electronic device is shut down forcibly according to the method, the element and the circuit board in the invention. Thus, the electronic device keeps the preset mechanism after the electronic device is shut down forcibly. In actual application, the electronic device in the invention may be a desktop computer, a notebook computer and a tablet personal computer, but the scope should not be limited thereto.

Figure 2:
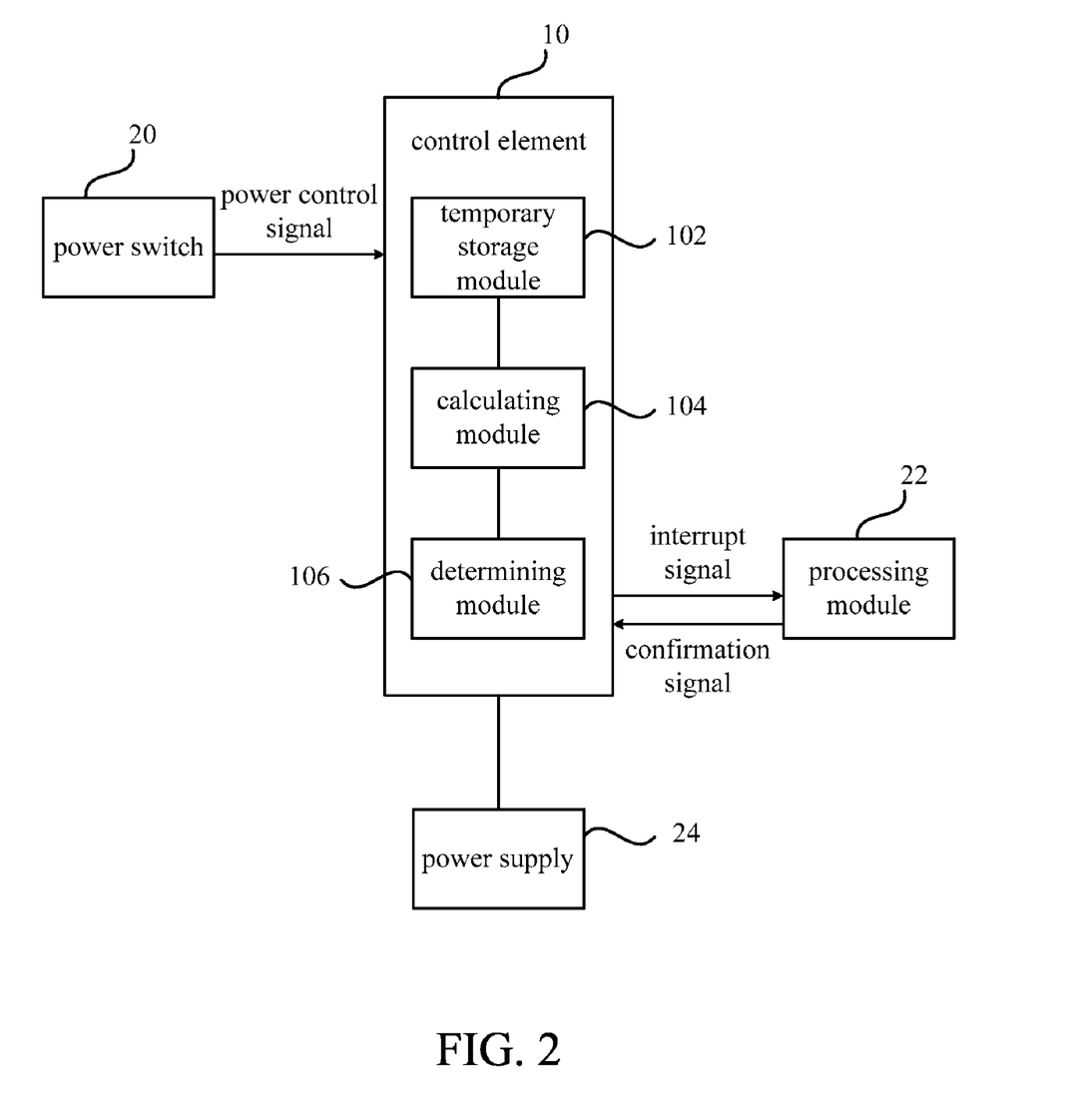
FIG. 2 is a functional block diagram showing the control element according to an embodiment of the invention.

FIG. 2 is a functional block diagram showing the control element according to an embodiment of the invention. As shown in FIG. 2, the control element 10 is connected to a power switch 20, a power supply 24 and a processing module 22 of an electronic device (not shown). The control element 10 is used to receive the power control signal transmitted by the power switch 20 and includes a temporary storage module 102, a calculating module 104 and a determining module 106.

The temporary storage module 102 may record the current signal level of the power control signal from the power switch 20. The calculating module 104 is connected to the temporary storage module 102 and used to calculate the duration of the power control signal at the preset signal level when the current signal level is in accord with the preset signal level.

In actual application, the power control signal has the above first signal level (such as 1) when the power switch 20 is not pressed. The preset signal level may be set to be the above second signal level (such as 0). Therefore, when the user presses the power switch 20, the signal level of the power control signal changes to be the second signal level 0, and this is in accordance with the preset signal level. At that moment, the calculating module 104 begins to count time to calculate the duration of the power control signal at the preset signal level.

The determining module 106 is connected to the calculating module 104 to compare the duration calculated by the calculating module 104 with a preset threshold value to determine whether the duration is greater than the preset threshold value. In actual application, the preset threshold value may be set by a designer or a user via the control element 10. For example, it may be designed to be two seconds, three seconds, four seconds, five seconds, ten seconds and so on. However, the scope is not limited thereto.

If the determining module 106 determines that the duration of the power control signal at the preset signal level is greater than the threshold value, the determining module 106 generates an interrupt signal. The interrupt signal is transmitted to the processing module 22 to drive the processing module 22 to set one or more preset mechanisms of the electronic device according to the interrupt signal.

In actual application, the preset mechanism in the invention may be a waking mechanism, an alarming mechanism and so on. Furthermore, the waking mechanism may be a WOL mechanism, a wake on mouse mechanism, a wake on keyboard mechanism or other proper waking mechanisms.

The preset mechanism in the invention also may be one of other proper mechanisms, and it is not limited thereto. The related content of the mechanism is illustrated in the embodiments as follows.

In addition, if the determining module 106 determines that the duration of the power control signal at the preset signal level is smaller than the threshold value, the determining module 106 may perform no action, or the determining module 106 also may inform the operation system of the electronic device that the above normal shutdown process is performed.

In actual application, after the processing module 22 sets the preset mechanism, a confirmation signal is generated and output to the control element 10 to make the processing module 22 control the power supply 24 of the electronic device to stop supplying power according to the confirmation signal to shut down the electronic device.

To sum up, the control element in the invention may preset the above mechanisms when the electronic device is shut down forcibly. Thus, the problem in the prior art that the mechanisms lose effectiveness due to the force shutdown of the electronic device is solved, and this may reduce the trouble of the user.

Figure 3:
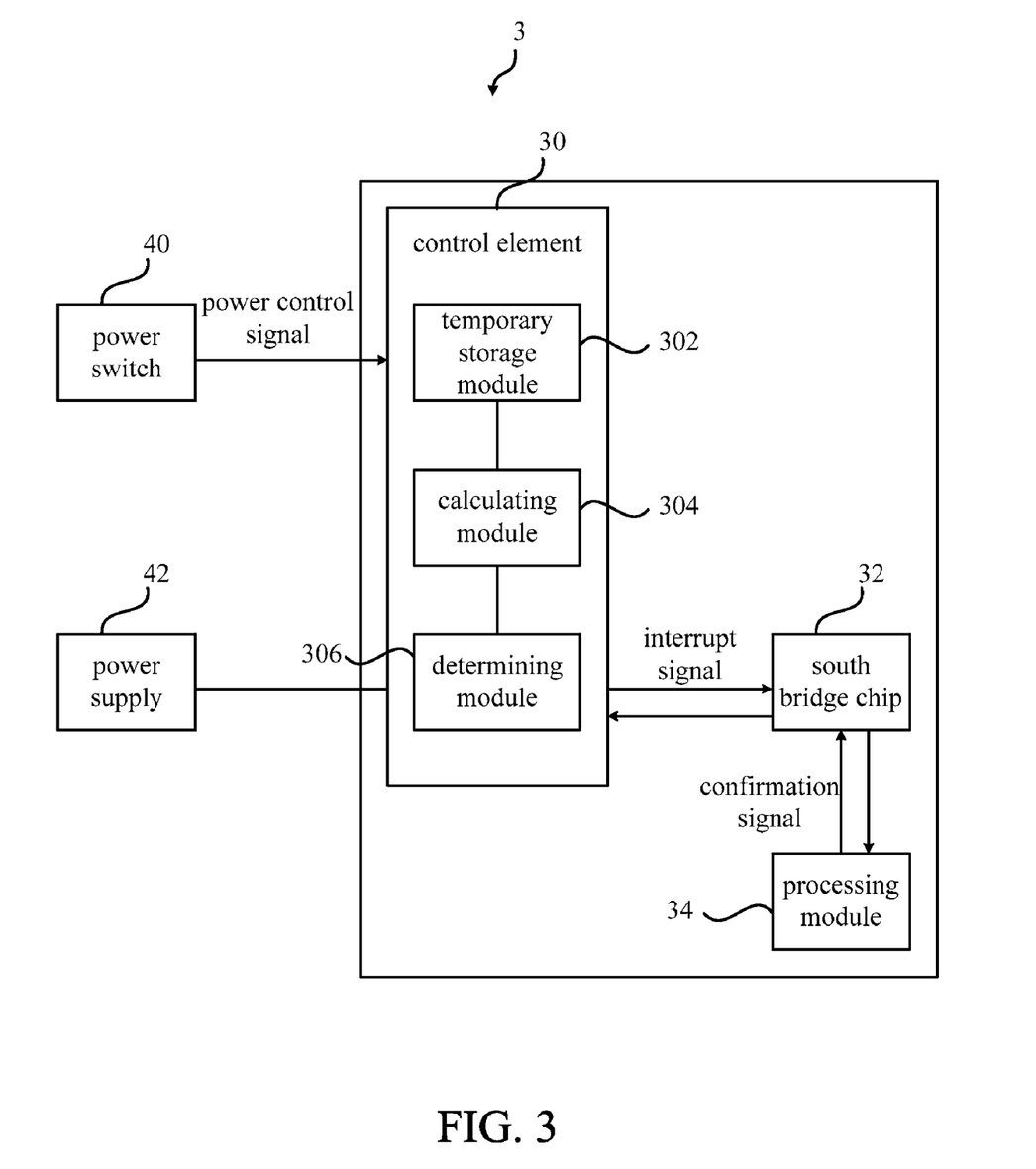
FIG. 3 is a functional block diagram showing the control circuit board according to an embodiment of the invention.

FIG. 3 is a functional block diagram showing the control circuit board according to an embodiment of the invention. As shown in FIG. 3, the control circuit board 3 includes a control element 30, a south bridge chip 32 and a processing module 34. In actual application, the control circuit board 3 may be a mother board, but the scope should not be limited thereto.

The control element 30 is coupled to the power switch 40 and the power supply 42 of the electronic device (not shown), respectively. The control element 30 is used to receive a power control signal from the power switch 40 and determines if the duration of the power control signal at the preset signal level is greater than the preset threshold value. If yes, the control element 30 generates and outputs an interrupt signal.

In actual application, the control element 30 may include the above temporary storage module 302, the calculating module 304 and the determining module 306. The connecting modes, the operation modes and the functions of these modules are the same as those of the examples above, and they are not illustrated herein for concise purpose. The modules may be integrated or divided, and they are not limited to be particular forms. In addition, the modules also may be realized by hardware or firmware.

The south bridge chip 32 is coupled to the control element 30 and the processing module 34, respectively, and used to receive the interrupt signals from the control element 30 and transmit the interrupt signal to the processing module 34. The processing module 34 may set the preset mechanism of the electronic device according to the interrupt signal.

In actual application, after the processing module 34 sets the preset mechanism, it may generate and output a confirmation signal to the control element 30, and the control element 30 controls the power supply 42 of the electronic device to stop supplying power according to the confirmation signal to shut down the electronic device.

In actual application, the processing module 34 in the invention may be a BIOS module or an embedded control module, but the scope should not be limited thereto. Furthermore, the processing module 34 in the invention also may be realized by hardware or firmware.

Figure 4:
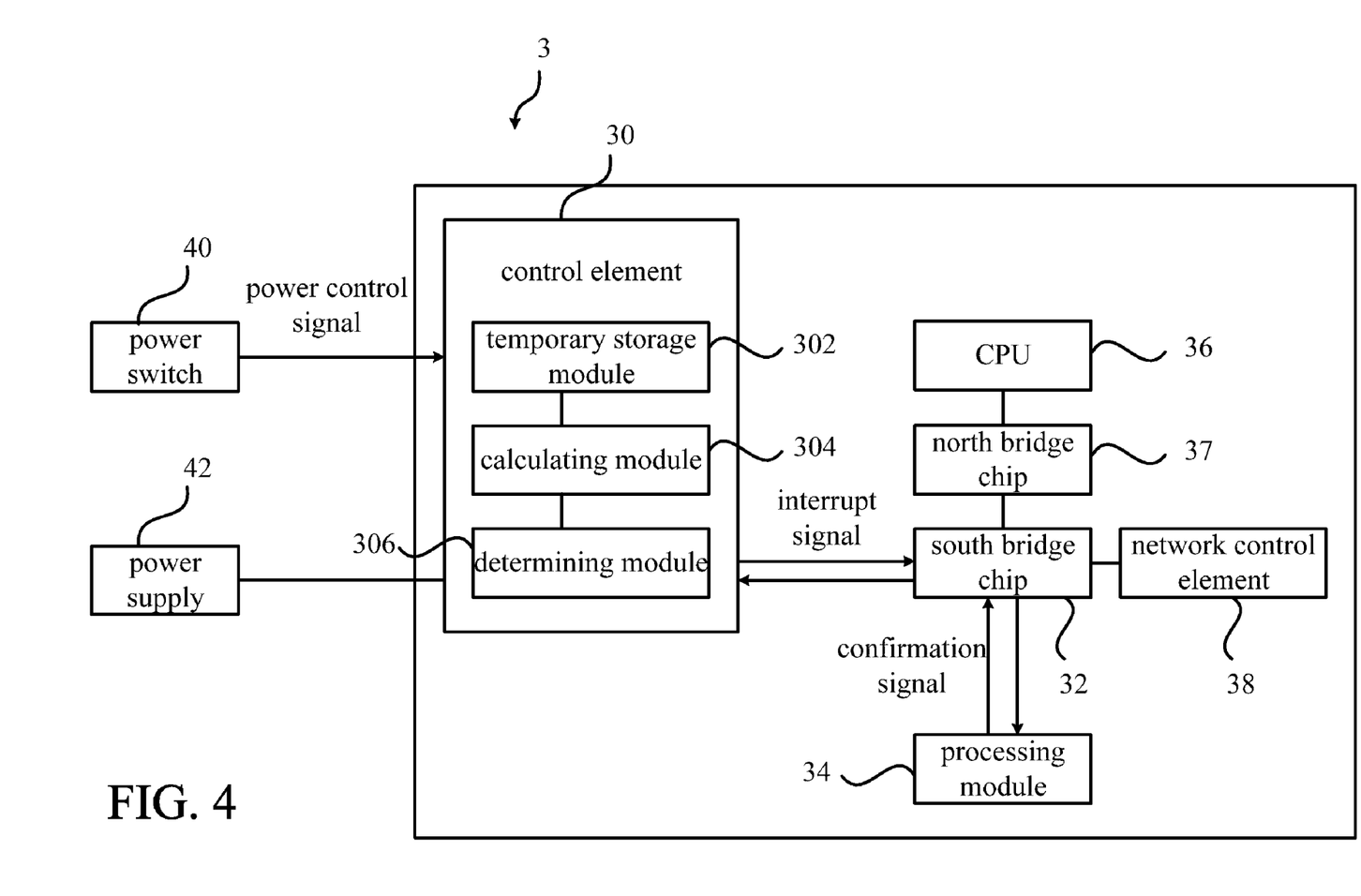
FIG. 4 is a functional block diagram showing the control circuit board according to another embodiment of the invention.

As shown in FIG. 4, it is a functional block diagram showing the control circuit board according to another embodiment of the invention. As shown in FIG. 4, besides the control element 30, the south bridge chip 32 and the processing module 34 shown in FIG. 3, the control circuit board 3 further includes a CPU 36, a north bridge chip 37 and a network control element 38. In actual application, the control circuit board 3 also may include other proper elements.

The CPU 36 may execute and control various calculating functions of the electronic device, and the north bridge chip 37 is coupled to the CPU 36 and the south bridge chip 32, respectively, to assist in transmitting signals between the south bridge chip 32 the CPU 36. In actual application, the CPU 36 is inserted in the special socket on the control circuit board 3, and it also may be replaced. In addition, the network control element 38 is connected to the south bridge chip 32, and it communicates with other elements on the control circuit board 3 via the south bridge chip 32.

The preset mechanisms in the invention may be a waking mechanism, an alarming mechanism and so on. Furthermore, the waking mechanism may be a WOL mechanism, a wake on mouse mechanism, a wake on keyboard mechanism or other proper waking mechanisms.

For example, when the preset mechanism is a WOL mechanism, the processing module 34 sets the network control element 38 to allow the network control element 38 to receive the above waking signal packet. In addition, the processing module 34 also sets the south bridge chip 32 to allow the south bridge chip 32 to receive the waking signal generated by the network control element 38 according to the waking signal packet. Thus, even though the electronic device is shut down forcibly, it also may reserve a WOL mechanism via the control circuit board 3 of the invention.

In another example, when the preset mechanism is an alarming mechanism, the processing module 34 transmits a driving signal to the network control element 38, and the network control element 38 sends an alarming signal to a monitoring terminal (not shown) according to the driving signal to inform the monitoring terminal that the electronic device is to be shut down. Thus, the electronic device may inform the monitoring terminal when the electronic device is shut down forcibly, and then the monitoring terminal or other related monitoring persons may handle the situation properly. For example, the waking signal is transmitted to wake the electronic device.

Figure 5:
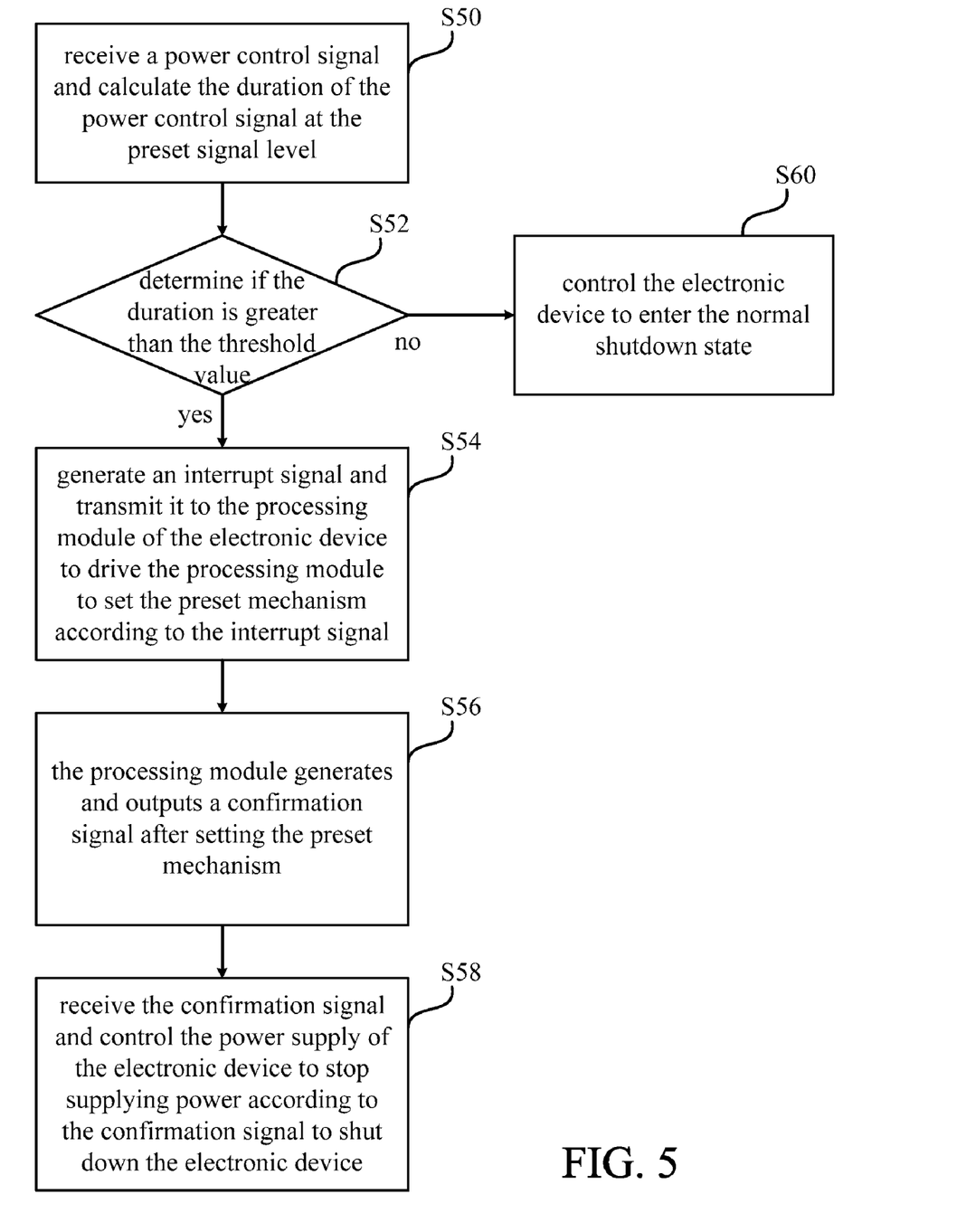
FIG. 5 is a flow chart showing the control method according to an embodiment of the invention.

As shown in FIG. 5, it is a flow chart showing the control method according to an embodiment of the invention. The method according to the invention includes the steps as follows.

In step S50, a power control signal is received, and the duration of the power control signal at the preset signal level is calculated. In step S52, whether the duration is greater than a threshold value is determined. If yes (for example, the user continues pressing the power switch), step S54 is performed. An interrupt signal is generated and transmitted to a processing module of the electronic device. In the invention, the processing module is driven to set a preset mechanism of the electronic device according to the interrupt signal in step S54.

According to step S54, the processing module may generate and output a confirmation signal (as shown in step S56) after setting the preset mechanism. In addition, the method in the invention may further include step S58. The confirmation signal is received, and the power supply of the electronic device is controlled to stop supplying power according to the confirmation signal. Thus, the electronic device is shut down.

In the embodiment, if the determination of step S52 is "no" (for example, the user presses the power switch once and then released), step S60 in the method of the embodiment of the invention is performed. The electronic device is controlled to enter the normal shutdown state. However, in actual application, if the determination in step S52 is "no", in the method of the embodiment of the invention, no steps may be performed.

The above steps may be performed by the control element in the invention (step S52 may be performed by the determining module of the control element), but it also may be performed by other proper units or modules, and it is not limited to the embodiment.

Figure 6:
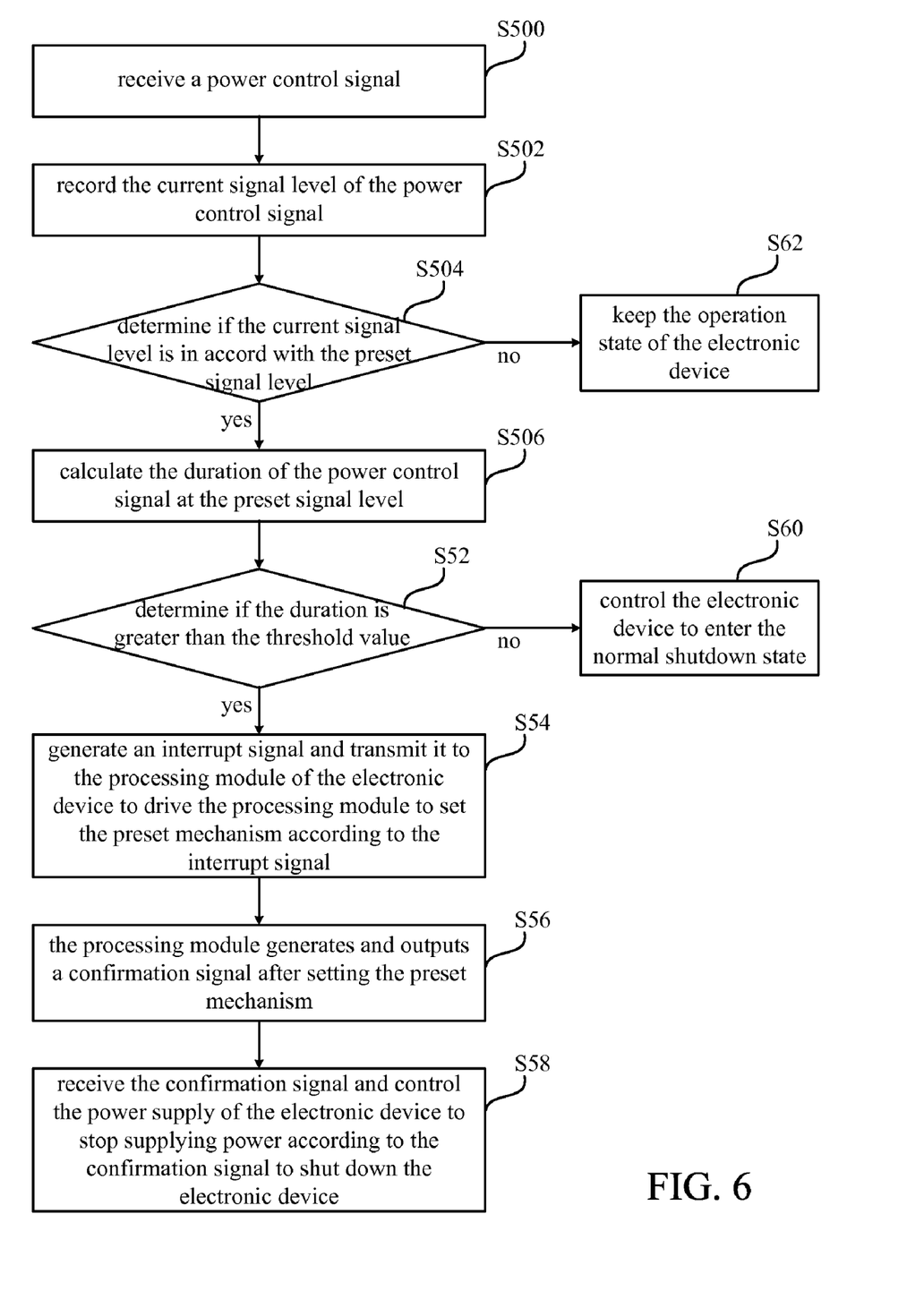
FIG. 6 is a flow chart showing the control method in another embodiment of the invention.

As shown in FIG. 6, it is a flow chart showing the control method in another embodiment of the invention. As shown in FIG. 6, the step S50 in FIG. 5 may further include the steps as follows. In step S500, the power control signal is received. In step S502, a current signal level of the power control signal is recorded. In step S504, whether the current signal level is in accord with the preset signal level is determined. If the determination in step S504 is "yes", in step S506, the duration of the power control signal at the preset signal level is calculated. The steps are performed by the temporary storage module and the calculating module of the control element in the embodiment of the invention. However, it also may be performed by other proper units or modules, and it is not limited in the invention.

In the embodiment, if the determination in step S504 is "no", step S62 in the method of the embodiment of the invention may be performed, and operation state of the electronic device is kept. However, in actual application, if the determination in step S504 is "no", performing no steps is also feasible in the method of the invention.

In addition, the preset mechanism may be a waking mechanism, an alarming mechanism and so on. Furthermore, the waking mechanism may be a WOL mechanism, a wake on mouse mechanism, a wake on keyboard mechanism or other proper waking mechanisms. In addition, the processing module in the invention may make a setting or other proper settings with respect to different mechanisms.

To sum up, in the method, the elements and the circuit board for controlling the shutdown of the electronic device in the invention, several preset mechanisms of the electronic device may be set before the electronic device is shut down forcibly. This makes the electronic device reserve the preset mechanism after the electronic device is shut down forcibly.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for controlling a shutdown of an electronic device, comprising:
   (a) receiving a power control signal and calculating duration of the power control signal at a preset signal level;
   (b) determining if the duration is greater than a threshold value; and
   (c) if the duration is greater than the threshold value, generating an interrupt signal, and transmitting the interrupt signal to a processing module of the electronic device to drive the processing module to set a preset mechanism of the electronic device according to the interrupt signal.

2. The method according to claim 1, wherein the processing module generates and outputs a confirmation signal after setting the preset mechanism, the method further comprising the steps of:
   (d) receiving the confirmation signal and controlling a power supply of the electronic device to stop supplying power according to the confirmation signal to shut down the electronic device.

3. The method according to claim 1, wherein step (a) further comprises the steps of:
   (a1) recording a current signal level of the power control signal; and
   (a2) when the current signal level is in accord with the preset signal level, calculating the duration of the power control signal at the preset signal level.

4. The method according to claim 1, wherein the preset mechanism is a waking mechanism.

5. The method according to claim 4, wherein the waking mechanism is a wake on local area network (WOL) mechanism, a wake on mouse mechanism or a wake on keyboard mechanism.

6. The method according to claim 1, wherein the preset mechanism is an alarming mechanism.

7. The method according to claim 6, wherein the processing module transmits a driving signal to a network control element of the electronic device, and the network control element sends an alarming signal to a monitoring terminal according to the driving signal to inform the monitoring terminal that the electronic device is to be shut down.

8. An element for controlling a shutdown of an electronic device, wherein the element is connected to a power switch of the electronic device to receive a power control signal transmitted by the power switch, the element comprising:
   a determining module for determining if duration of the power control signal at a preset signal level is greater than a threshold value;
   wherein when the duration of the power control signal at the preset signal level is greater than the threshold value, the determining module generates an interrupt signal and transmits the interrupt signal to a processing module of the electronic device to drive the processing module to set a preset mechanism of the electronic device according to the interrupt signal.

9. The element according to claim 8, further comprising:
   a temporary storage module for recording a current signal level of the power control signal; and
   a calculating module connected to the temporary storage module for calculating the duration of the power control signal at the preset signal level when the current signal level is in accord with the preset signal level;
   wherein the determining module is connected to the calculating module to compare the duration calculated by the calculating module with the threshold value to determine if the duration is greater than the threshold value.

10. The element according to claim 8, wherein the processing module generates and outputs a confirmation signal to the element after setting the preset mechanism, and the element controls a power supply of the electronic device to stop supplying power according to the confirmation signal to shut down the electronic device.

11. The element according to claim 8, wherein the preset mechanism is a waking mechanism.

12. The element according to claim 11, wherein the waking mechanism is a WOL mechanism, a wake on mouse mechanism or a wake on keyboard mechanism.

13. The element according to claim 8, wherein the preset mechanism is an alarming mechanism.

14. The element according to claim 13, wherein the processing module transmits a driving signal to a network control element of the electronic device, and the network control element sends an alarming signal to a monitoring terminal according to the driving signal to inform the monitoring terminal that the electronic device is to be shut down.

15. The element according to claim 8, wherein the processing module is a basic input/output system (BIOS) module or an embedded control module.

16. A circuit board for controlling a shutdown of an electronic device comprising:
   a control element, connected to a power switch and a power supply of the electronic device, respectively, for receiving a power control signal from the power switch and determining if duration of the power control signal at a preset signal level is greater than a threshold value, wherein if the duration is greater than the threshold value, the control element generates and outputs an interrupt signal; and
   a south bridge chip, connected to the control element and a processing module, respectively, for receiving the interrupt signal from the control element and transmitting the interrupt signal to the processing module;
   wherein the processing module sets a preset mechanism of the electronic device according to the interrupt signal.

17. The circuit board according to claim 16, further comprising:
   a central processing unit (CPU) for executing and controlling various calculating functions of the electronic device; and
   a north bridge chip, connected to the CPU and the south bridge chip, respectively, for assisting in transmitting signals between the south bridge chip and the CPU.

18. The circuit board according to claim 16, wherein the control element further comprises:
   a temporary storage module for recording a current signal level of the power control signal;
   a calculating module, connected to the temporary storage module, for calculating the duration of the power control signal at the preset signal level when the current signal level is in accord with the preset signal level; and
   a determining module, connected to the calculating module, for comparing the duration calculated by the calculating module and the threshold value to determine if the duration is greater than the threshold value.

19. The circuit board according to claim 16, wherein the processing module generates and outputs a confirmation signal to the element after setting the preset mechanism, and the element controls a power supply of the electronic device to stop supplying power according to the confirmation signal to shut down the electronic device.

20. The circuit board according to claim 16, wherein the preset mechanism is a waking mechanism.

21. The circuit board according to claim 20, wherein the waking mechanism is a WOL mechanism, a wake on mouse mechanism or a wake on keyboard mechanism.

22. The circuit board according to claim 21, wherein when the waking mechanism is a WOL mechanism, the circuit board further comprises a network control element, the processing module sets the network control element to make the network control element capable of receiving a waking signal packet, and the processing module sets the south bridge chip to make the south bridge chip capable of receiving a waking signal generated by the network control element according to the waking signal packet.

23. The circuit board according to claim 16, wherein the preset mechanism is an alarming mechanism.

24. The circuit board according to claim 23, further comprising a network control element, wherein the processing module transmits a driving signal to the network control element of the electronic device, and the network control element sends an alarming signal to a monitoring terminal according to the driving signal to inform the monitoring terminal that the electronic device is to be shut down.

25. The circuit board according to claim 16, wherein the processing module is a BIOS module or an embedded control module.

* * * * *